Figure 4:
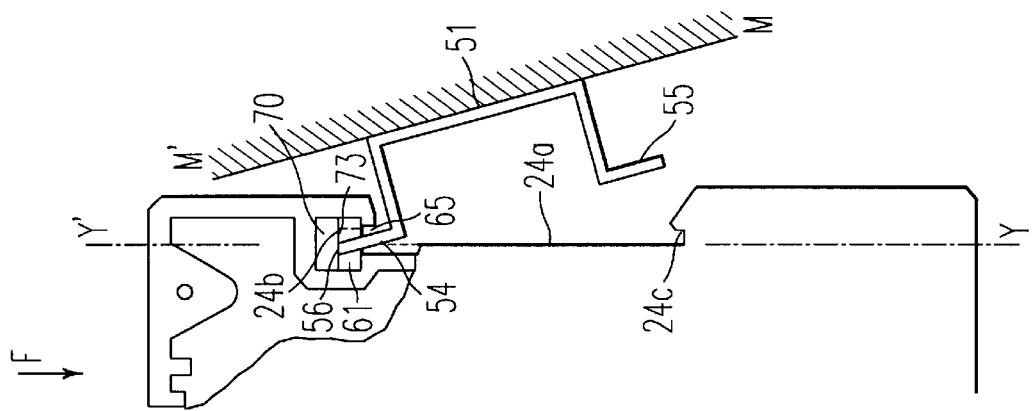

United States Patent
Barbier et al.

[11] Patent Number: 5,810,618
[45] Date of Patent: Sep. 22, 1998

[54] DEVICE FOR FASTENING AN ELECTRICAL APPARATUS

[75] Inventors: René Barbier, Remilly sur Tille; Jean-Luc Bouchard, Dijon, both of France

[73] Assignee: Schneider Electric SA, Boulogne Billancourt, France

[21] Appl. No.: 781,837

[22] Filed: Jan. 10, 1997

[30] Foreign Application Priority Data

Jan. 18, 1996 [FR] France .................................. 96 00836

[51] Int. Cl.6 .................................................. H01R 13/518
[52] U.S. Cl. ............................................ 439/532; 439/716
[58] Field of Search ................................ 439/532, 716, 439/94

[56] References Cited

U.S. PATENT DOCUMENTS 5,480,310  1/1996  Baum ........................................ 439/716

FOREIGN PATENT DOCUMENTS

| | | |
|---|---|---|
| 1587497 | 3/1970 | France . |
| 2259268 | 8/1975 | France ............................ 439/716 |
| 2 551 807 | 3/1985 | France . |
| 1 191 180 | 12/1965 | Germany . |
| 2 182 711 | 5/1987 | United Kingdom . |
| 2 277 201 | 10/1994 | United Kingdom . |

*Primary Examiner*—Gary F. Paumen
*Assistant Examiner*—Tho D. Ta
*Attorney, Agent, or Firm*—Oblon, Spivak, McClelland, Maier & Neustadt, P.C.

[57] ABSTRACT

Fastening device for an electrical apparatus (10) whose base (20) has a central clearance (60) shaped to fit a support rail (50) and delimited on one side by an open slide rail (61) into which one of the edges (54) of the support rail can be fitted while the other edge of the support rail (55) can be held by retaining hooks (24c), characterized in that:

the base (20) is formed out of an extruded part, the device comprises at least one deflection spring (70) that inserts smoothly into the slide rail (61) so that the length of the spring runs more or less along the length of the slide rail, the deflection spring (70) being a leaf spring with one contact surface (73) capable of pressing against the cant (56) of one edge (54) of the rail.

6 Claims, 4 Drawing Sheets

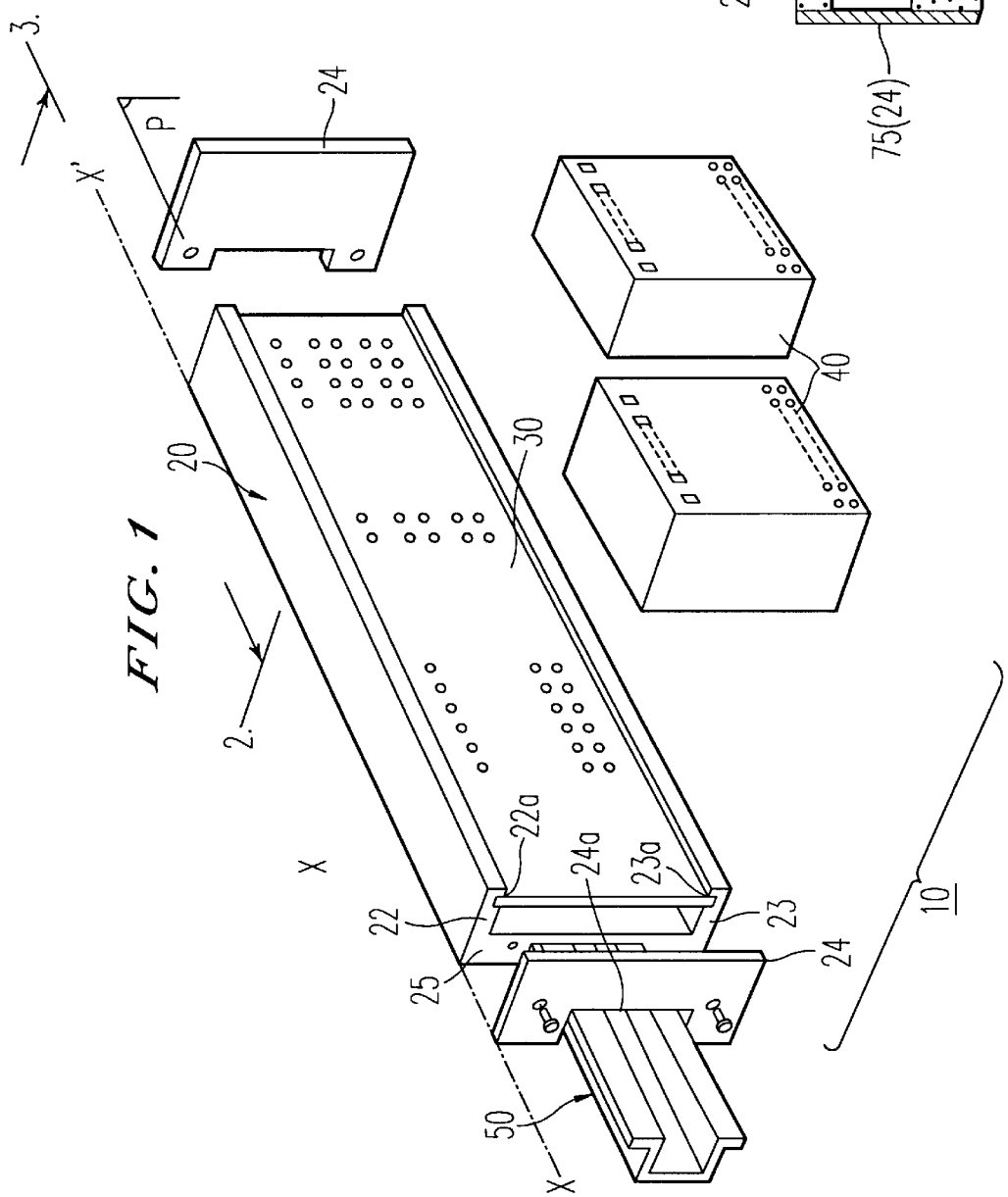

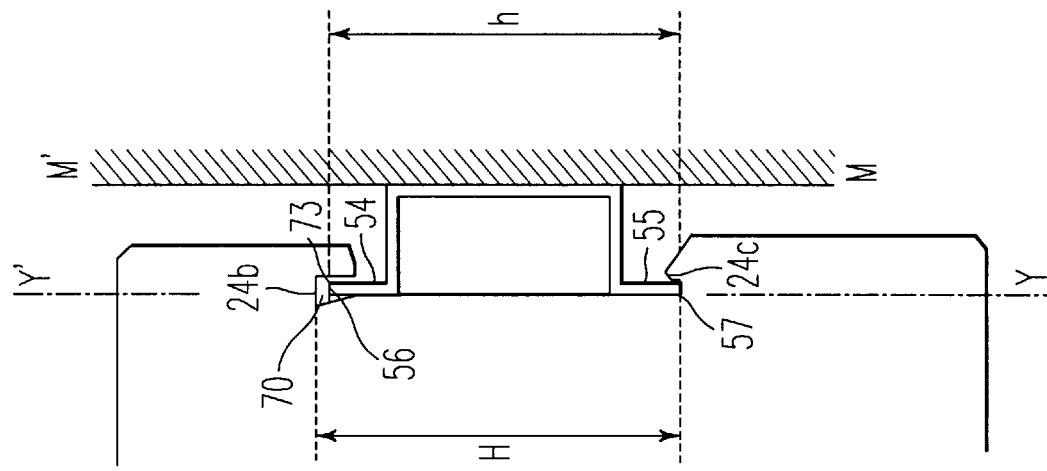
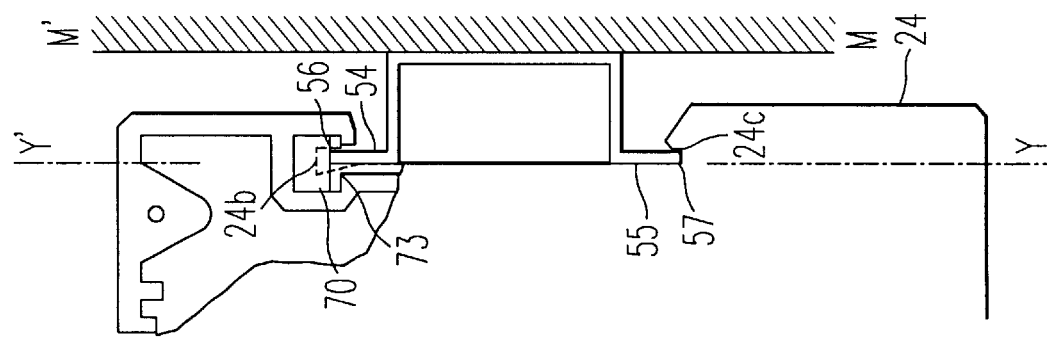

DEVICE FOR FASTENING AN ELECTRICAL APPARATUS

The present invention relates to a device for fastening an electrical apparatus, particularly an interface apparatus, whose base has a central clearance shaped to fit a support rail and delimited on one side by an open slide rail into which one of the edges of the support rail can be fitted while the other edge of the support rail can be held by retaining hooks.

It is known that the lateral ends of the base of an interface may be fitted with lateral flanges enabling the interface to be fastened to a rail by means of resilient runners engaged into said flanges. The resilient runners serve to mount and position the interface as well as fastening it to the rail.

If, however, the interface is incorrectly dismantled, the resilience limit of the runners can easily be exceeded causing them to become incapable of fulfilling their fastening function. Moreover, flanges that fulfill positioning and fastening functions are molded parts with a necessarily complex shape.

The presence of runners for fastening apparatus also increases the dimensions of such apparatus, particularly as regards its depth.

The purpose of the present invention is to produce cheaply and simply a fastening device for electrical apparatus that will ensure rigid fastening of the apparatus to the rail. It also reduces the dimensions of the fastening device, thereby reducing the overall dimensions of the interface.

According to the invention the device is characterized in that a base is formed out of an extruded part, by having at least one deflection spring that inserts smoothly into the slide rail so that the length of the spring runs more or less along the length of the slide rail, the deflection spring being a leaf spring with one contact surface capable of pressing against the cant of one edge of the rail, and means of stopping the spring within the slide rail.

Lateral flanges are mounted on the lateral ends of the base and have stops designed to bear on the cant of the edge of the support rail housed in the slide rail thereby limiting the deflection of the spring.

The leaf spring has an undulation comprising at least two upper and lower convexities that press on the bottom of the slide rail and on the inner rebates of the slide rail parallel to the bottom, the upper convexity constituting the contact surface between the spring and the rail.

The forward end of the spring conveniently has a convexity that matches the bottom of the slide rail to facilitate insertion of the spring into the slide rail and the rear end of the spring has a retaining stop designed to brake the spring inside the slide rail.

Retention of the spring inside the slide rail is ensured by fastening lateral closing flanges to the extremities of the base. The lateral flanges may also include retaining hooks designed to hold the edge of the rail opposite the edge housed in the slide rail of the base.

Figure 2:
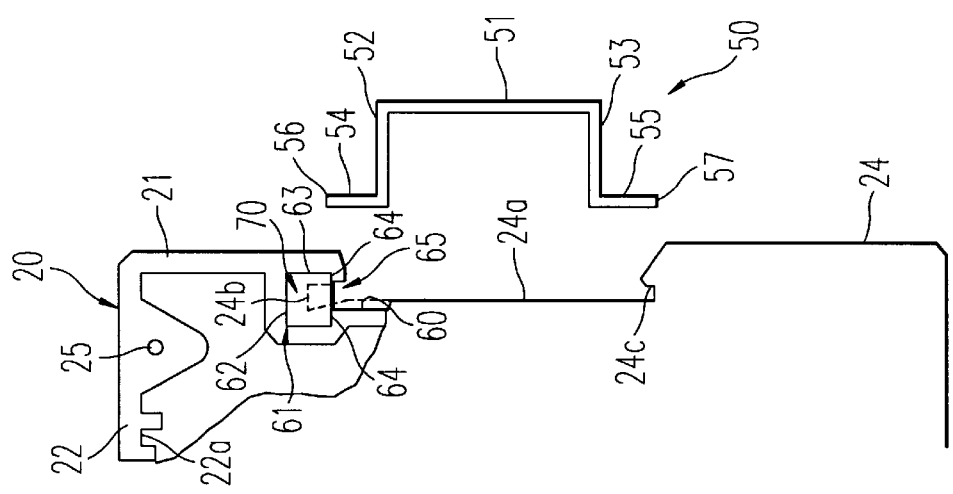

The following description refers to the drawings and shows the characteristics and advantages of the invention. In the attached drawings:

FIG. 1 is an exploded perspective view of an interface mounted on a support rail, FIG. 2 is a side view, partly in cross section along II—II, of the base of the interface equipped with the fastening device according to the invention, FIG. 3 is a rear cross section along III—III of part of the base, FIG. 4 is a side view, partly in cross section along II—II, of the apparatus about to be fitted onto the support rail, FIG. 5 is a side view of the apparatus, partly in cross section along II—II after fitting onto the support rail, FIG. 6 is a side view of the apparatus after fitting onto the support rail.

Figure 7:
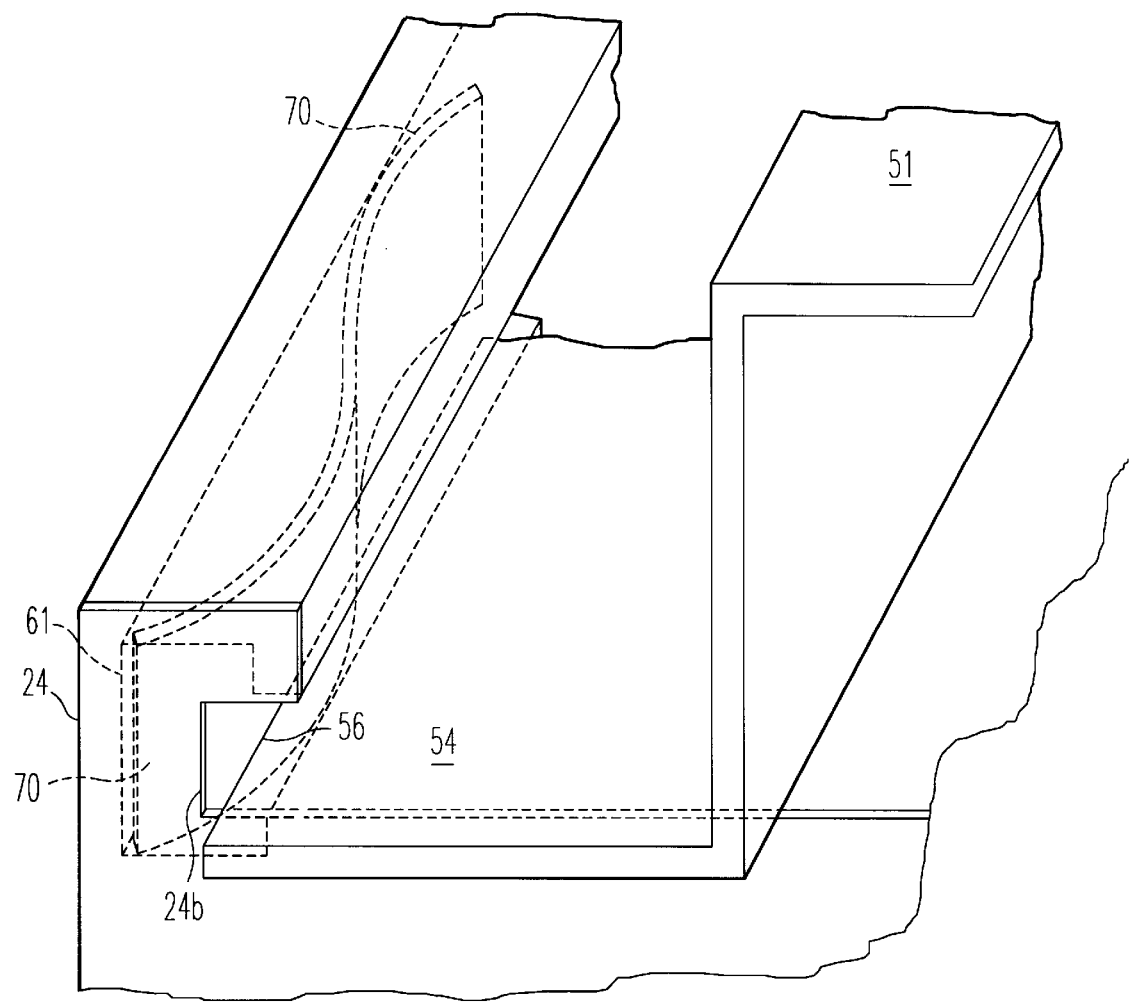

FIG. 7 is a perspective view of the apparatus after being fitted onto the support rail.

Interface 10 shown in FIG. 1 is designed to be connected electrically between a processing unit, for example a programmable controller, and a piece of electrical equipment capable of being operated or controlled by said unit.

Apparatus 10 has an elongated base 20 running along a X–X' direction, a printed circuit board 30 in overall plane P housed in the base along the length of the latter and modular electrical interface units 40 fastened by welds to board 30.

Base 20 (FIG. 2) is U-shaped in cross-section and is a plastic component obtained by extrusion and cut to the length necessary for the number of modular units required.

Base 20 has a stem 21 parallel to plane P, an upper wing 22 and a lower wing 23. Wings 22 and 23 project outward from the stem and form a pair of grooves 22a and 23a that run along X–X' direction allowing board 30 to be slid between them.

Lateral closing flanges 24 are fitted to the lateral extremities of the base; they are fastened to the base by means of screws that fit into holes 25 located near the joints between wings 22 and 23 and stem 21, but could also be fastened by a system of clips.

Interface 10 is designed to be mounted on the support rail 50 of a wall or plate.

Support rail 50 is folded so it has a standardized cap-shaped cross section. The rail consists of a central stem 51 connected to two wings 52 and 53 folded to form two edges 54 and 55 in the same plane on either side of the central stem 51. The upper edge 54 forms an upper cant 56 and the lower edge 55 forms a lower cant 57.

The device for fastening the apparatus to the rail comprises resilient positioning and gripping means located on the base and retaining means located on the lateral flanges.

The rear of stem 21 of base 20 has a central clearance 60 that runs along the length of the base and is shaped to fit support rail 50. The upper end of clearance 60 is delimited along axis X–X' by a slide rail 61, downwardly open and designed to receive the upper edge 54 of the rail.

Open slide rail 61 comprises a bottom 62, edges 63 fitted with inner rebates 64 parallel to bottom 62 and an opening 65 located between the rebates 64 and opposite bottom 62. The slide rail can house at least one leaf-type deflection spring 70 along axis X—X' that constitutes the resilient positioning and gripping means. Depending on the length of the bottom, it is possible to provide two leaf springs located respectively at each end of the slide rail.

Leaf spring 70 is inserted smoothly by sliding into slide rail 61 so that the length of the spring runs more or less along the length of the slide rail.

When the spring is introduced into the slide (FIG. 3) the spring is gripped and able to bend at right angles to X–X'. The spring has an undulation 71 such that the upper and lower convexities 72a and 72b of the undulation press on the width of the spring along the bottom 62 and the inner rebates 64 of the slide rail. The upper convexity 72b constitutes the forward extremity of the spring to facilitate the insertion of the spring in the slide rail. The lower convexity 72a constitutes a contact surface 73 designed to contact the rail 50. A retaining stop 74 constitutes the rear end of the spring and is in contact with the bottom 62 of the slide rail to brake the spring. The spring is retained inside slide rail 61 by stopping means 75. The stopping means 75 consist of closing flanges 24 that block the ends of the slide rail. It is also possible to add as stopping means a transversal shape to the inside of the slide rail such as a concavity able to coordinate with stop 74.

Lateral closing flanges 24 comprise a clearance 24a parallel to plane P that houses rail 50 and positioned it so that it protrudes from clearance 60 in the base. The upper part of clearance 24a is delimited by a stop 24b designed to bear on the upper cant 56 of the rail while the lower part of the clearance is delimited by retaining hooks 24c constituting means of retaining the lower edge 55 of the rail.

The operation of the device will now be described with reference to FIGS. 4, 5 and 6.

In order to mount the interface 10 onto the support rail 50, the rail is engaged via opening 65 of the slide rail on the upper edge 54 of the rail (FIG. 4) so that the contact surface 73 of leaf spring 70 presses on cant 56 of upper edge 54. It will be noted that upper edge 54 is partially engaged in slide rail 61 but that lower edge 55 is not engaged in retaining hooks 24c. Plane Y–Y' of the bottom of clearance 24a is at an acute angle to plane M–M' of stem 51 of the support rail.

In order to clip the interface onto the rail, more or less vertical downward force F is applied to the interface, causing leaf spring 70 to deflect and move slightly towards upper edge 54 in slide rail 61. The interface is then slightly tilted so that the stops 24b of the flanges press against the upper cant 56 of the rail and the lower edge 55 of the rail is positioned facing the hooks 24c. When the force exercised on the interface is released, the hooks 24c on the flanges engage with edge 55 of the rail and the bottom of the hooks bear on cant 57 of the rail (FIGS. 5 and 6).

The dimensions of clearances 60 of the base and 24a of the flanges are such as to allow the components to be clipped together when leaf spring 70 deflects. Height H between stops 24b and the bottom of hooks 24c is slightly greater than height h between cants 56 and 57 (FIG. 6).

Moreover, lateral flanges 24 serve the dual function of stopping and enclosing the spring by blocking slide rail 61, and of limiting deflection of the spring by stop 24b that presses on the upper cant 56 of the rail. Because the spring cannot be damaged or crushed beyond its resilience limits the gripping function is always ensured.

To remove interface 10 from support rail 50, the user only needs to exert a more or less vertical downward force on the interface while tilting it to bring it into the position shown in FIG. 4.

It is obvious that slide rail 61 could equally well be fitted into the lower rather than the upper section of clearance 60 in the base and that retaining hooks 24c would then be located on the upper part of the flanges.

In a different embodiment of the fastening device, retaining hooks 24c could be built into the base and located opposite slide rail 61.

In the fastening device described above an electrical apparatus is fastened onto a support rail with cap-shaped cross-section; it could clearly be fastened onto any type of rail by using a fastening device fitted, for example, with a pair of slide rails facing one another and fitted with deflection springs.

We claim:

1. A device for fastening an electrical apparatus to a support rail, comprising:

a base provided in an electrical apparatus, wherein said base has a central clearance that matches a support rail, wherein said base is an extruded part:

an open slide rail formed on a first side of said clearance in which a first edge of the support rail can be housed;

at least one retaining hook formed in a second side of said clearance for holding a second edge of the support rail;

at least one deflection spring provided in said slide rail such that a length of the spring runs substantially along a length of the slide rail, wherein said deflection spring is a leaf spring with at least one contact surface capable of pressing against a cant of one edge of the support rail; and lateral flanges mounted on lateral ends of the base, said flanges having stops designed to bear on the cant of the edge of the support rail housed in the slide rail in order to limit deflection of spring.

2. The device according to claim 1, wherein the leaf spring has an undulation comprising at least a lower and an upper convexity that bear on a bottom of the slide rail and bear on plural inner rebates of the slide rail, wherein said inner rebates are parallel to the bottom of said slide rail, and wherein said contact surface is formed by the lower convexity of the undulation.

3. The device according to claim 1, wherein the leaf spring has at a forward end, a convexity that matches the bottom of the slide rail to facilitate insertion of the spring into the slide rail, and wherein the device has at a rear end, a retaining stop designed to brake the spring inside the slide rail.

4. The device according to claim 1, wherein said lateral flanges are configured so as to close the ends of slide rail.

5. The device according to claim 1, wherein said stopping means consist of a transverse shape built into the slide rail.

6. The device according to claim 1, wherein plural retaining hooks are built into said lateral flanges mounted on the lateral extremities of the base.

* * * * *